(12) United States Patent
Kubota et al.

(10) Patent No.: US 7,954,720 B2
(45) Date of Patent: Jun. 7, 2011

(54) CARD RECORDING APPARATUS

(75) Inventors: Tsuyoshi Kubota, Kai (JP); Daisuke Kaneoya, Yamanashi-ken (JP); Hiroshi Mochizuki, Nirashiki (JP); Toshiro Fujimoto, Minami-Alps (JP)

(73) Assignee: Nisca Corporation, Yamanashi (JP)

( * ) Notice: Subject to any disclaimer, the term of this patent is extended or adjusted under 35 U.S.C. 154(b) by 587 days.

(21) Appl. No.: 12/003,266

(22) Filed: Dec. 21, 2007

(65) Prior Publication Data

US 2008/0156883 A1 Jul. 3, 2008

(30) Foreign Application Priority Data

Dec. 28, 2006 (JP) ................. 2006-353841

(51) Int. Cl.
*G06K 13/00* (2006.01)
*G06K 19/06* (2006.01)
(52) U.S. Cl. ............. 235/475; 235/493; 235/449
(58) Field of Classification Search .......... 235/449, 235/380, 375, 487, 493, 475; 400/244, 120.1
See application file for complete search history.

(56) References Cited

U.S. PATENT DOCUMENTS

| | | | | |
|---|---|---|---|---|
| 5,321,239 A | * | 6/1994 | Masubuchi et al. | ........... 235/380 |
| 5,326,179 A | | 7/1994 | Fukai et al. | |
| 5,959,278 A | * | 9/1999 | Kobayashi et al. | ........... 235/449 |
| RE38,295 E | * | 11/2003 | Kobayashi et al. | ........... 235/449 |
| 2001/0052923 A1 | * | 12/2001 | Suzuki | ........................ 347/217 |
| 2004/0081501 A1 | * | 4/2004 | Kobayashi et al. | ...... 400/120.01 |
| 2004/0108385 A1 | * | 6/2004 | Suzuki et al. | ................ 235/493 |
| 2008/0156883 A1 | * | 7/2008 | Kubota et al. | ................ 235/475 |
| 2009/0116891 A1 | * | 5/2009 | Aihara | ......................... 400/244 |

FOREIGN PATENT DOCUMENTS

| | | |
|---|---|---|
| JP | H09-131930 | 5/1997 |
| JP | H11-073478 | 3/1999 |
| JP | 2005-075603 | 3/2005 |
| WO | WO 98/34790 | 8/1998 |

* cited by examiner

*Primary Examiner* — Thien M Le
(74) *Attorney, Agent, or Firm* — Manabu Kanesaka

(57) ABSTRACT

A printing apparatus has a casing, a card supply opening at one side of the casing, a printing unit that performs a predetermined recording to a card supplied from the card supply opening, nip rollers that nip the card when being recorded at the printing unit, a magnetic encoder unit disposed adjacent to the printing unit that performs a predetermined recording to the card nipped by the rollers, and a card discharge outlet that discharges the card recorded at the printing and/or magnetic encoder units. The card supply opening, the printing unit and the magnetic encoder unit are disposed sequentially and substantially horizontally along the card conveyance path, and the card discharge outlet is provided in a side of the casing so that the card supply opening and card discharge output are positioned substantially vertically.

11 Claims, 10 Drawing Sheets

CARD RECORDING APPARATUS

BACKGROUND OF THE INVENTION AND RELATED ART STATEMENT

The present invention generally relates to a card recording apparatuses. More particularly, the present invention relates to a card recording apparatuses having a plurality of recording devices that perform predetermined recording processes on a card-shaped recording medium.

Conventionally, a printing apparatuses that have a printing head to print characters and images to a card-shaped medium or a card, to supply a card from one side of the apparatus via a simple path configuration (card conveyance path configuration) that eliminates a complex moving mechanism.

Also, presently, card-shaped recording medium for credit cards, cash cards, license cards and ID cards, there are card recording apparatuses are equipped with a magnetic recording function to magnetically record information to a magnetic strip on the card in addition to a printing function to thermally transfer predetermined images and characters by interposing a thermal transfer film between a card and thermal head. Such an apparatus is disclosed in U.S. Pat. Nos. 3,366,791, and 3,614,302.

However, although it is possible to reduce the length of the apparatus by half, by disposing the plurality of units such as the printing unit and the magnetic encoding unit vertically and splitting the card conveyance path into two vertically, the volume of the apparatus is not substantially reduced, and the card conveyance path is notably longer because of the simple parallel setup of the plurality of the recording units. Thus, the overall size of the apparatus is enlarged.

It is therefore an object of the present invention to provide a card recording apparatus that has a plurality of recording units and has a compact overall size. According to the present invention, a first recording unit and a second recording unit are sequentially disposed substantially horizontally, and a card discharge outlet is established at one side of the apparatus frame so that a card supply opening and the card discharge outlet are positioned vertically (one above the other). Therefore, the card conveyance path is not long. This makes the overall size of the apparatus compact.

Further objects and advantages of the invention will be apparent from the following description of the invention.

SUMMARY OF THE INVENTION

To accomplish the above object, a card recording apparatus according to the present invention comprises an apparatus frame, a card supply opening established at one side of the frame, a first recording unit that performs a predetermined recording process on the card supplied from the card supply opening, rollers to sandwich the card while being recorded at the first recording unit, a second recording unit disposed adjacent to the first recording unit that performs a predetermined recording on the card sandwiched by the rollers, and a card discharge outlet for discharging the card recorded at the first and the second recording units. The card supply opening, the first recording unit and the second recording unit are disposed sequentially and substantially horizontally along a conveyance direction of the conveyed card, and the card discharge outlet is provided at one side of the frame so that the card supply opening and card discharge outlet are positioned vertically.

The present invention disposes substantially horizontally in sequence along the card conveyance path, the card supply opening established at one side of the frame, the first recording unit that performs the predetermined recording on a card supplied from the card supply opening, and the second recording unit that performs the predetermined recording on the card. The card supplied from the card supply opening is conveyed along the substantially horizontal card conveyance path to the first recording unit (or the second recording unit). Predetermined recording is performed by first recording unit (or the second recording unit) while the card is sandwiched by rollers, then the card is conveyed from the first recording unit (or the second recording unit) along the card conveyance path to the second recording unit (or the first recording unit) where predetermined recording is performed. However, it is also acceptable to perform predetermined recording at only one of either the first or the second recording units. The card, recorded at the first and the second recording units is conveyed toward the card discharge outlet provided at one side of the frame to be positioned vertically with the card supply opening (one is above the other), and is discharged from the card discharge outlet. According to the present invention, a first recording unit and a second recording unit are sequentially disposed substantially horizontally, and a card discharge outlet is established at one side of the apparatus frame so that a card supply opening and the card discharge outlet are positioned vertically (one above the other). Therefore, the card conveyance path is not long. This makes the overall size of the apparatus compact.

Further, it is acceptable to equip a card supply unit disposed to connect to the card supply opening and able to store a plurality of cards in a stack, that supplies stored cards sequentially, one at a time to the card supply opening, and a card storage unit that stores cards discharged from the card discharge outlet.

The printer apparatus according to the present invention has conveyance rollers disposed between the card supply opening and the first recording unit that convey the card. If a moving mechanism is provided to move the conveyance rollers between a first position, where the conveyance rollers form a horizontal card conveyance path to convey the card substantially horizontally, and a second position, to convey the card recorded at the first and second recording units to the card discharge outlet, it is possible for the moving mechanism to move the conveyance rollers to the first position that forms a horizontal card conveyance path and the second position to convey the card to the card discharge outlet. This shortens the card conveyance path to the card discharge outlet positioned vertically with regard to the card supply opening. The moving mechanism can be composed of roller shafts that support the conveyance rollers, a geared bracket that supports the roller shafts and has a gear on one portion, a motor gear that meshes with the geared bracket, and a drive motor that drives the motor gear in forward and reverse directions. There are at least two conveyance rollers. When the conveyance rollers are positioned at the first position by the moving mechanism they can convey the card supplied from the card supply opening to the first and the second recording units, and when they are positioned at the second position by the moving mechanism, they form an oblique card conveyance path to guide the card to the card discharge outlet. Also, a conveyance drive motor is provided to rotatably drive the conveyance rollers in the forward and reverse directions. If the conveyance drive motor is disposed below the first recoding unit and between the second recording unit and moving mechanism, the plurality of units can be rationally positioned thereby making the overall apparatus size compact.

Further, in the present invention, the first recording unit is a printer that prints characters and images to the card; the second recording unit is a magnetic encoder unit that magnetically records information to the card. It is preferable for the magnetic encoder unit to have a magnetic head that can move along the card conveyance path where the card is conveyed. With the above configuration, the card is stopped and the magnetic head is self-propelled to move along a surface of the card. Therefore, it is possible to increase the processing precision of both the first recording unit (printing unit) and the second recording unit (magnetic encoder unit). In that, it is possible to adjust the differences in writing density caused by conveyance speed of the same card at the first and second recording units (magnetic encoder unit) that can occur if a magnetic encoder unit is used where the magnetic head is stationary and the card is conveyed.

Furthermore, if the apparatus has a card conveyance outlet at another side of the frame opposing the card supply opening that can convey the card outside of the frame, the card can be conveyed out of the apparatus from the card conveyance outlet formed at the other side of the frame instead of the card discharge outlet formed on one side of the frame positioned vertically in relation to the card supply opening. This configuration increases the convenience of the apparatus for users.

Further, in the present invention, if a cleaning member disposed between the card supply opening and the conveyance rollers that cleans a surface of the card, the surface of the card can be cleaned by the cleaning member when the card is conveyed into the apparatus frame. This configuration prevents foreign matter such as dust and dirt from getting into the apparatus thereby improving print quality when printing characters and images to the card. It is preferable to provide a cleaner to remove the dirt adhering to a surface of the cleaning member. The first recording unit has at least an ink medium for forming characters and images and a cartridge that houses the ink medium. If the cleaner is fastened to a portion of the cartridge, it is possible to replace the cleaner when replacing the cartridge. This configuration improves apparatus usability.

DETAILED DESCRIPTION OF PREFERRED EMBODIMENTS

The following will now explain an embodiment of the present invention applied to a card recording apparatus that has a function to record characters and images to a card-shaped recording medium (hereinafter simply referred to as a card), and a function to magnetically record information to a magnetic strip portion on the card, with reference to the drawings provided.

Figure 11:
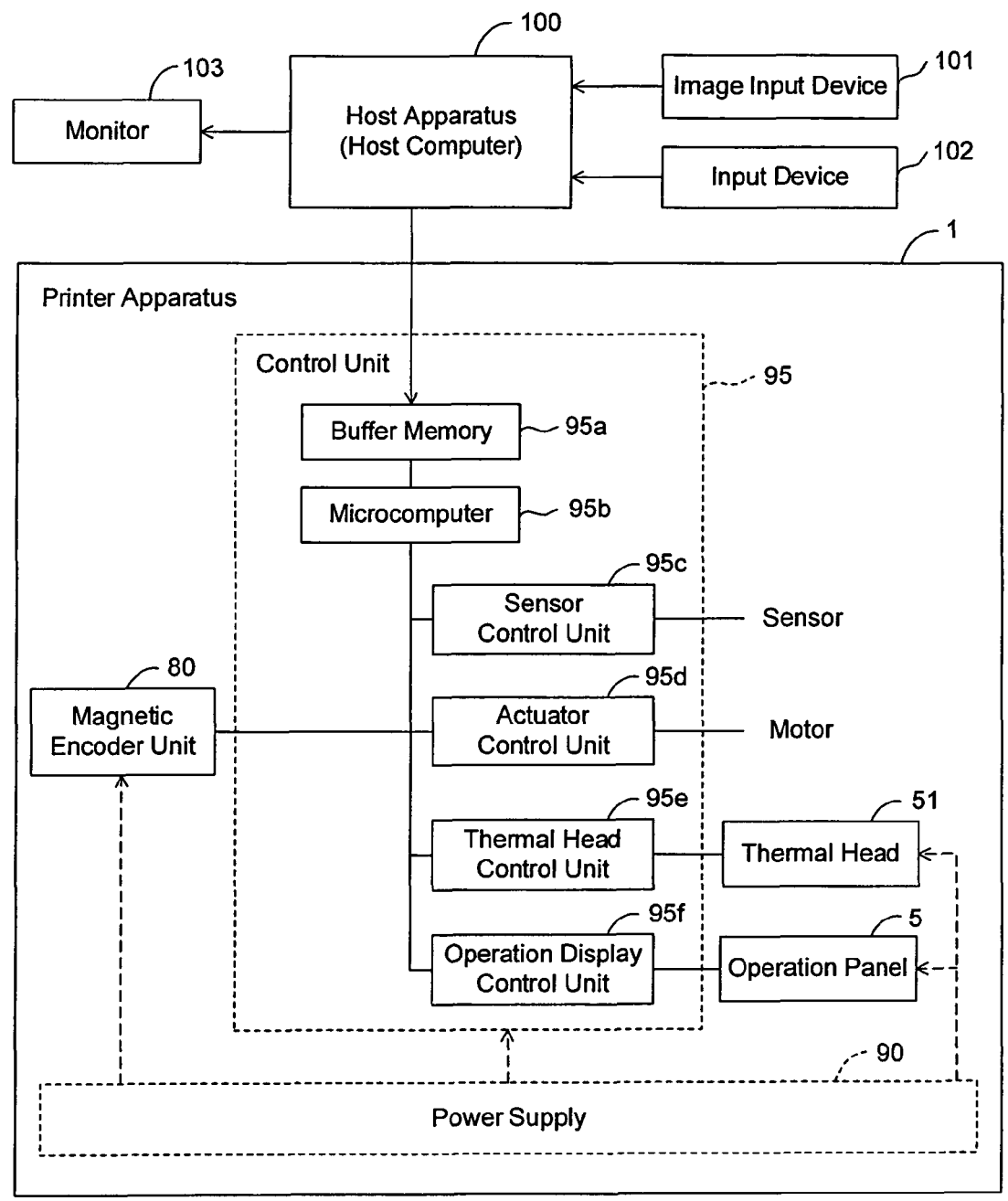
FIG. 11 is a block diagram of the general configuration of the printer apparatus according to the present invention.

As shown in FIG. 11, the printer apparatus 1 of this embodiment of the present invention is connected to a host apparatus 100 (for example, a host computer such as a personal computer or the like) via an interface, not shown. The host apparatus 100 provides instructions such as recording operations and the like by sending print recording data and magnetic recording data to the printer apparatus 1. Note that the printer apparatus 1 has an operation panel (operation display unit) 5 (see FIGS. 11 and 1). Therefore, in addition to the recording operation instructions sent from the host apparatus 100, recording operation instructions can also be designated using this operation panel 5.

Generally, an image input device 101 such as a scanner or the like that reads images recorded on an original; an input device 102 such as a keyboard and mouse and the like that inputs: instructions and data to the host apparatus 100; and a monitor 103 such as a liquid crystal display that displays data generated using the host apparatus 100 are connected to the host apparatus 100.

Figure 1:
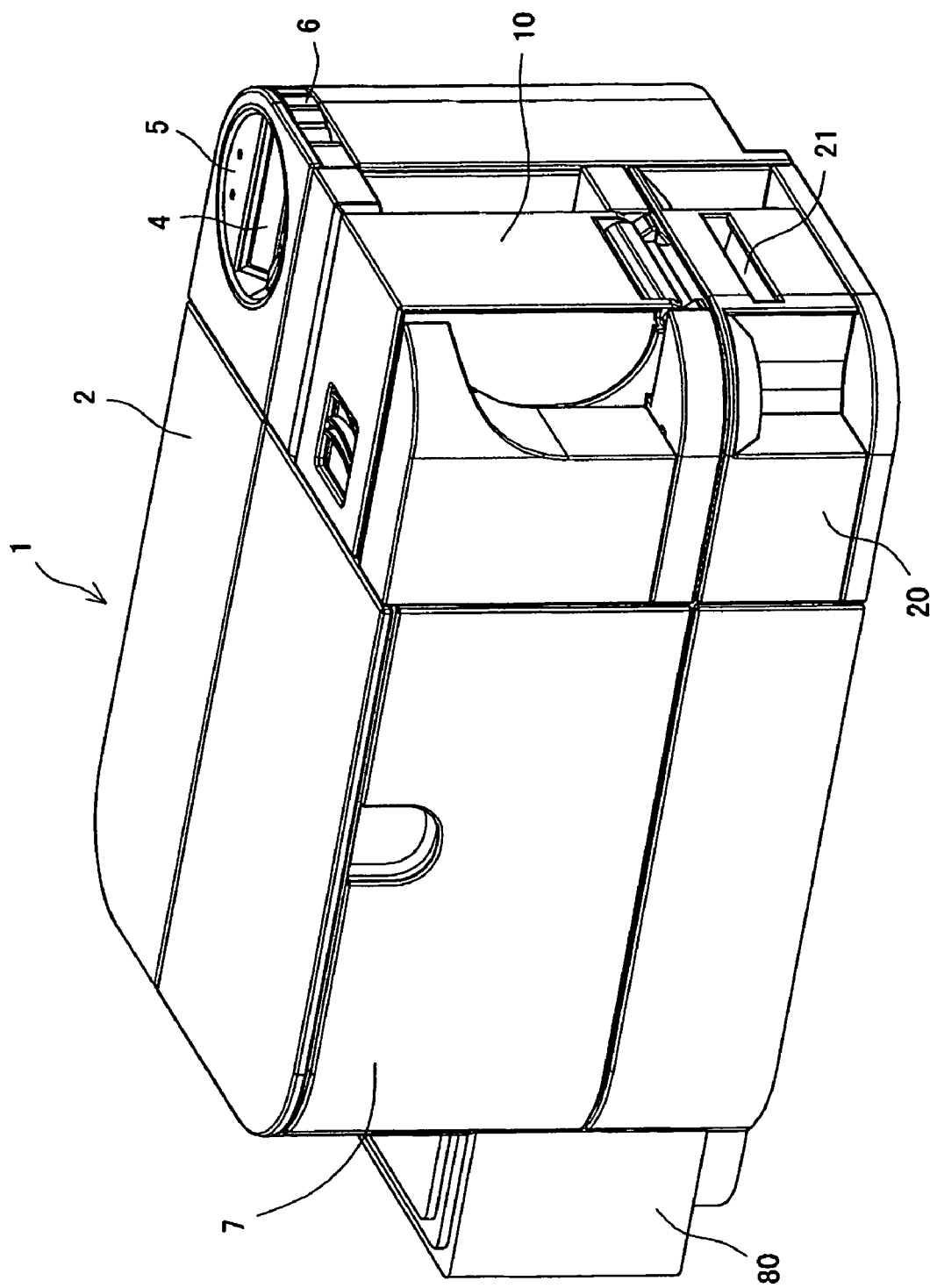
FIG. 1 shows an external perspective view of a printing apparatus of an embodiment that applies the present invention.

As shown in FIG. 1, the printer apparatus 1 according to the present invention has a card supply unit 10 detachably mounted to a casing 2 at one side thereof, that can store in a stack shape (approximately 100 cards) a plurality of blank cards prior to recording; a card storage unit 20 detachably mounted to the casing 2 at one side thereof, that can store recorded cards in an oblique state (approximately 30 cards) equipped below the card supply unit 10; a display unit 4 that displays operating states including any errors that could occur on the printer apparatus 1, at a position adjacent to the card supply unit 10 at one side of the same casing 2, and an operation panel 5 for making various settings such as the print and magnetic recording processes. It is to be noted that the operation panel 5 is disposed to rotate in synchronization to the rotation of a dial 6.

A card discharge outlet 21 formed as an opening to discharge recorded cards to outside of the apparatus is provided at one portion of the card storage unit 20 so that the cards can be discharged from the apparatus when the card storage unit 20 is full. Also, an opening cover 7 is provided at one surface of the printer apparatus 1 to allow access to an inside of the apparatus to detach a cartridge 52 (see FIG. 2) that houses an ink ribbon R, described below, used to print record. The opening cover 7 composes a portion of the casing 2.

Further, at another side of the casing 2, a magnetic encoder unit 80 is disposed as a second recoding unit, a portion thereof projecting into the casing 2 opposing the card supply unit 10 and card storage unit 20.

Figure 2:
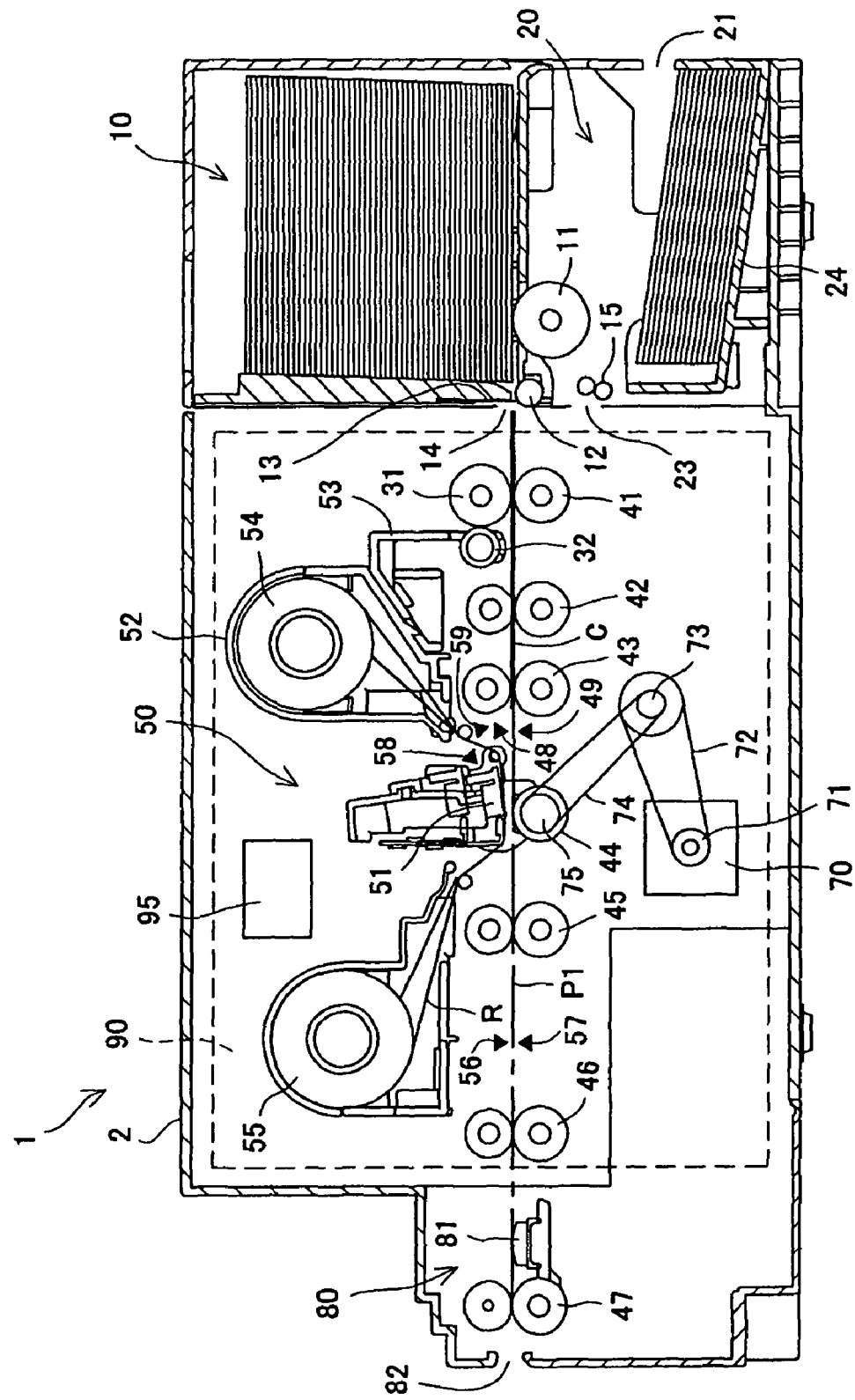
FIG. 2 is a schematic view of a blank card, prior to the recording process being, conveyed in a printer apparatus.
Figure 3:
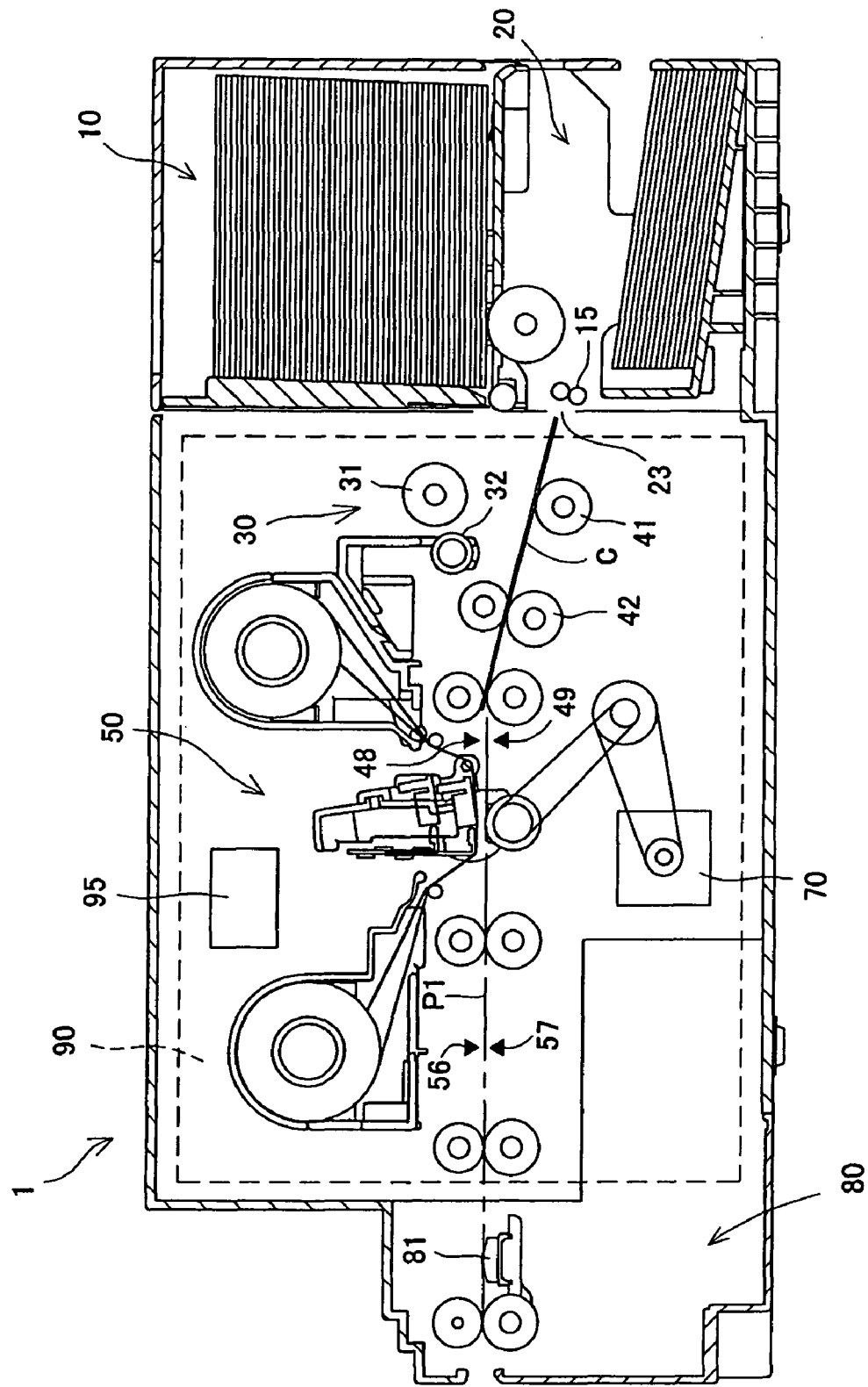
FIG. 3 is a schematic sectional view of the card, after the recording process, being discharged in a printer apparatus of the embodiment.

The following will now explain each composing element inside the printer apparatus 1 with reference to FIGS. 2 and 3. FIG. 2 shows a blank card C prior to being recorded supplied from the card supply unit 10. The card C is being conveyed toward a printing unit 50 as a first recording unit. A cleaning roller 31 cleans the surface of the conveyed card C as a card member of the card cleaning mechanism 30 by coming into contact with the surface of the card C is described below.

FIG. 3 shows the card C to be recorded at the printing unit 50 and the magnetic encoder unit 80 being conveyed toward the card storage unit 20. The conveyance rollers 41 and 42 maintain the card C in a conveyable state toward the card discharge outlet 23 by shifting from a first position, that forms a substantially horizontal card conveyance path, to a second position, that forms an oblique card conveyance path using a moving mechanism 60, described below.

The card supply unit 10 is detachably installed at one side of the printer apparatus 1. The card supply unit 10 stores therein a plurality of blank cards prior to processing, and has a supply roller 12 and separating gate 13 composed of a plate-shaped member to allow the passage of only one card C when a supply roller 11 established on the apparatus side (printer apparatus 1) is rotatably driven by a motor, not shown, to dispose a bottommost card (the card at the bottom of the stack) into the apparatus. The supplied card C passes the supply roller 12 and the separating gate 13 and is guided to a card supply opening 14 opened at one side of the casing to link with the card supply unit 10. Note that a flexible pad, not shown, is positioned at a bottom edge of the separating gate 13. For example, even in a case of supplying cards having different thicknesses, it is still possible to separate cards into a single card for supply purpose.

The card storage unit 20 is detachably installed below the card supply unit 10 at one side of the printer apparatus 1 (casing 2). The card storage unit 20 stores recorded cards C in an oblique state. A storage tray 24 a bottom surface therein formed to an oblique state is provided in the card storage unit 20. The card storage unit 20 has an opening below the card supply opening 14 at one side of the casing 2 to store the recorded card C sequentially discharged by a discharge roller 15 from the card discharge outlet 23. (See FIG. 3).

Further, the discharge roller 15 is fastened to a side of the printer apparatus 1. A motor, not shown, that drives the supply roller 11 rotatably, also drives the discharge roller 15. In the case where the supply roller is rotating in a direction to supply a blank card C, the reverse drive of the motor, not shown, rotatably drives to discharge the card C to the storage tray 24. Specifically, the supply roller 11 and discharge roller 15 are rotated by the forward and reverse drives of the motor, not shown, but because a one-way clutch, not shown, is installed in the supply roller 11, it is possible to rotate only in the card feeding direction (rotational drive is not transmitted in a direction reverse to the card feeding direction because of the one-way clutch). On the other hand, the discharge roller 15 is rotatably driven in both directions by the forward and reverse drives of the motor, not shown. In this embodiment, the supply operation for blank cards C that have not been recorded and the discharge operation for recorded cards C do not occur at the same time, so the rotation for discharging the card C by the discharge roller 15 and the rotation in a direction opposite thereto are not hindered.

The card C supplied from the card supply opening 14 is conveyed along the substantially horizontal card conveyance path P1 being sequentially handed over to the conveyance rollers 41, 42 and 43 having driving force transmitted from the conveyance drive motor 70, described below. Note that the conveyance rollers 42 and 43 are composed of a pair of rollers having a drive roller and a follower roller. (Hereinafter, unless a different explanation is provided, the explanation will focus only on the drive roller, omitting an explanation of the follower roller of the pair of rollers.)

At an opposite side of the conveyance roller 41, the cleaning roller 31 that composes a portion of the card cleaning mechanism 30 described below is positioned to advance to and retreat from the card conveyance path P1 to oppose the conveyance roller 41. When the cleaning roller 31 is advanced towards the card conveyance path P1 to touch the conveying card C (see the state shown in FIG. 2), the card C is gripped between the cleaning roller 31 and the conveyance roller 41 that has drive force, thereby removing foreign matter such as dust and dirt from the print surface to be printed at the printing unit 50.

When the cleaning roller 31 advances toward the card conveyance path P1 which is where the roller operates, the cleaning roller 31 is positioned to touch the surface of a roller-shaped cleaner 32 positioned at a predetermined position away from the card conveyance path P1 adjacent to the cleaning roller 31. The roller-shaped cleaner 32 has a cleaning roller with a smaller outside diameter (roller diameter) than the outside diameter (roller diameter) of the cleaning roller, and is rotatably mounted to a support member 53 detachably installed at a predetermined position of a cartridge 52 that houses an ink ribbon R as ink media that composes a portion of the printing unit 50.

Further, the cleaning roller 31 is composed of rotatable roller-shaped member the surface thereof being made of a rubber material having an adhesive property. Also, the roller-shaped cleaner 32 is wrapped with an adhesive tape having a sponge layer on the resin, rotatable roller-shaped member. Because the adhesive tape has a higher adhesive property than the adhesive property of the cleaning roller 31 surface, foreign matter such as dust and dirt removed from the card C and adhering to the cleaning roller 31 surface is shifted to the adhesive tape that forms the surface of the cleaning roller 32 by mutual contact of both surfaces.

At a downstream side in the direction of card conveyance of the conveyance roller 43, the printing unit 50 that prints predetermined characters and images to the surface of the card C cleaned by the cleaning roller 14 is located.

The printing unit 50 adopts the configuration of a thermal transfer type printer. This unit has a thermal head 51 provided to advance and retreat with regard to a platen roller 44 located at a printing position on the card conveyance path P1. The ink ribbon R having a plurality of colors of an ink layer Y (yellow), M (magenta), C (cyan), and Bk (black) and the like repeated sequentially on its surface, interposes the platen roller 44 and the thermal head 51. The ink ribbon R is housed in the cartridge described 52 above.

Further, When thermally transfer-recording information such as characters or images and the like to the card C moving along the card conveyance path P1, the ink ribbon R is supplied from the ribbon supply reel 54 and conveyed to the leading end of the thermal head 51 while touching substantially the entire surface thereof and is taken up by a take-up ribbon reel 55. The ribbon supply reel 54, and the ribbon take-up reel 55 are rotatably driven by a motor, not shown. The ink ribbon R interposes the thermal head 51 and the card C top surface. The ink ribbon R presses against the thermal head 51 while heating elements in the thermal head 51 are selectively operated to print predetermined characters and images to the card C. A plurality of guide shafts, and a transmissive type sensor composed of a light-emitting element 58 and a light-receiving element 59 that detects the ink layer Bk (black) to align the top of a predetermined ink layer (in this embodiment, the ink layer Y) are provided in the ink ribbon R conveyance path.

A transmissive type sensor (hereinafter referred to as a first card detection sensor) composed of a light-emitting element 48 and a light-receiving element 49 that detects a leading edge and a trailing edge in the direction of conveyance of the card C conveyed along the conveyance path P1 is disposed in an upstream side (the conveyance roller 43 side) in the direction of conveyance of the card of the thermal head 51.

A conveyance drive motor 70 composed of a stepping motor capable of both forward and reverse drives to rotatably drive the series of conveyance rollers 41, 42 and 43 and the platen roller 44 is disposed below the printing unit 50. A pulley 71 mounted on the rotating shaft of the conveyance drive motor 70 transmits the rotational driving force of the conveyance drive motor 70 to the pulley 73 by the belt 72, and drive is transmitted to the platen roller 44 by the belt 74 one end thereof trained on the pulley 73, via the pulley 75 disposed on the rotating shaft of the platen roller 44. The pulley 73 is composed of a two-step pulley. The belt 72 and the belt 74 are trained at the stepped portion.

A plurality of gears, not shown, is disposed on the rotating shaft of the platen roller 44 and the conveyance rollers 41, 42 and 43, and between each of the rollers. Rotational driving force transmitted to the platen roller 44 is further transmitted to each of the conveyance rollers 41, 42 and 43 via the plurality of gears.

Further, a nip roller 45 that nips the card C when print recording thereto by the printing unit 50 has a function to convey the card C to a downstream side of the platen roller 44 in the conveyance direction (the ribbon take-up reel 55 side) is disposed along the conveyance path P1. Further downstream of this nip roller 45 in the direction of card conveyance, a feed roller 46 is disposed to convey the card C along the same conveyance path P1. A transmissive type sensor (hereinafter referred to as a second card detection sensor) composed of a light-emitting element 56 and a light-receiving element 57 that detects a leading edge of the card C conveyed along the conveyance path P1 is disposed in substantially the center of the nip roller 45 and feed roller 46.

Gears, not shown, are mounted on the nip roller 45 and the feed roller 46. Also, a plurality of gears is disposed between the platen roller 44 and nip roller 45, and the nip roller 45 and the feed roller 46. The plurality of gears, not shown, mutually mesh to transmit the rotational drive force from the conveyance drive motor 70 to the nip roller 45 and the feed roller 46 by branching from the gear disposed on the rotating shaft of the platen roller 44 via drive force transmission mechanism including the pulleys, belts and plurality of gears, not shown. Note that the nip roller 45 and the feed roller 46 are configured to nip the card C in a stopped state when the magnetic encoder unit 80 magnetically records to a magnetic strip disposed on a back side of the print surface of the card C.

The magnetic encoder unit 80 is disposed adjacent to the feed roller 46 downstream of the printing unit 50 in the direction of card conveyance. A reciprocating (self-propelled) magnetic head 81 that scans along the conveyance path P1 is disposed in the magnetic encoder unit 80 to magnetically record to the magnetic strip of the card C held in a stopped state by the nip roller 45 and the feed roller 46.

A card discharge outlet 82 formed as an opening to discharge the card C conveyed along the conveyance path P1 to outside of the apparatus is provided at one portion of the magnetic encoder unit 80. Specifically, this card conveyance out outlet 82 is provided on an extended line of the conveyance path P1 at the other side of the casing 2 opposite to the card supply opening 14. Therefore, it is possible to convey in a cleaning card to clean the plurality of rollers disposed in the card conveyance path P1 outside via the card conveyance outlet 82 after cleaning the rollers.

Further, a conveyance roller 47 that conveys the card C toward the card conveyance outlet 82 and out of the card conveyance outlet 82 is disposed in the magnetic encoder unit 80. There is no drive source provided in the magnetic encoder unit 80 to rotatably drive the conveyance out roller 47, but a plurality of gears, not shown, are provided and linked between the conveyance out roller 47 and feed roller 46 to transmit rotational driving force transmitted to the feed roller to the conveyance out roller 47.

The conveyance roller 47 that conveys out the card C toward the card conveyance outlet 82 and out of the card conveyance outlet 82 is disposed in the magnetic encoder unit 80. There is no drive source provided in the magnetic encoder unit 80 to rotatably drive the conveyance out roller 47, but a plurality of gears, not shown, are provided and linked between the conveyance out roller 47 and feed roller 46 to transmit rotational driving force transmitted to the feed roller to the conveyance out roller 47.

Therefore, the printer apparatus 1 has a configuration that provides the card supply opening 14, the printing unit 50 and the magnetic encoder unit 80 along a substantially horizontal card conveyance path P1 connected from the card supply unit 10.

As is clearly shown in the drawing, the magnetic encoder unit 80 has a unit shape a portion thereof fit into the printer apparatus 1. The conveyance drive motor 70 is disposed below the printing unit 50 and between the magnetic encoder unit 80 and the moving mechanism 60 (see FIGS. 8 and 10) that moves the conveyance rollers 41 and 42 to the first and second positions.

The following will now explain the magnetic encoder unit 80 with reference to FIGS. 4 to 7. A switchback path P2 that is a portion of the card conveyance path P1 is formed downstream of the platen roller 44 to reversingly convey (switchback conveyance) toward the card supply opening 14 the card C that has passed through the printing unit 50 having the thermal head 51 and platen roller 44. (See FIG. 4.) A substantially U-shaped (in the cross section) fixed edge guide 87 and a substantially U-shaped (in the cross section) movable edge guide 88 are disposed to face each other at both sides of the card conveyance surface of the switchback path P2 to smoothly guide the conveyed card C along the card conveyance path P1.

The fixed side edge guide 87 receives the leading edge of the card C and guides it to the nipping points of the nip roller 45 and feed roller 46. If this guide is omitted, the leading edge of the conveyed card C will touch areas other than the nipping point between the nip roller 45 and feed roller 46 which makes smooth conveyance difficult. On the other hand, the movable adjusting side edge guide 88 guides the other edge of the conveyed card C along with the fixed side edge guide 87. The movable adjusting side edge guide 88 can move to adjust the guide width to correspond to the size of the card C width and is constantly urged to the fixed side edge guide 87 by a spring, not shown.

Further, the magnetic encoder unit 80 is provided a head drive mechanism to reciprocate the magnetic head 81. The head drive mechanism is composed of a head carriage 84, carriage guide 85 and a timing belt 86. The head carriage 84 is installed with the magnetic head 81 and is movably supported by the carriage guide 85 to reciprocatingly drive in the magnetic encoder regional (see FIG. 4.). The drive force is supplied, with the drive amount monitored, by a direct current motor equipped with an encoder, not shown, via the timing belt. The carriage guide 85 is composed of a pair of left and right shafts that guide the head carriage 84 parallel to the magnetic strip on the card C. A masking plate 84*a* detected by the transmissive type head detection sensor 83 mounted to a support frame that supports the carriage guide 85, to detect the magnetic head 81 position, is integrated with the head carriage 84.

Also, the magnetic encoder unit 80 is composed of a head advancing mechanism that advances and retreats the magnetic head 81 between a retreated position where the head is positioned below the card conveyance surface of the card conveyance path P1 and an operating position to write to and read from the magnetic strip on the card C.

Figure 7:
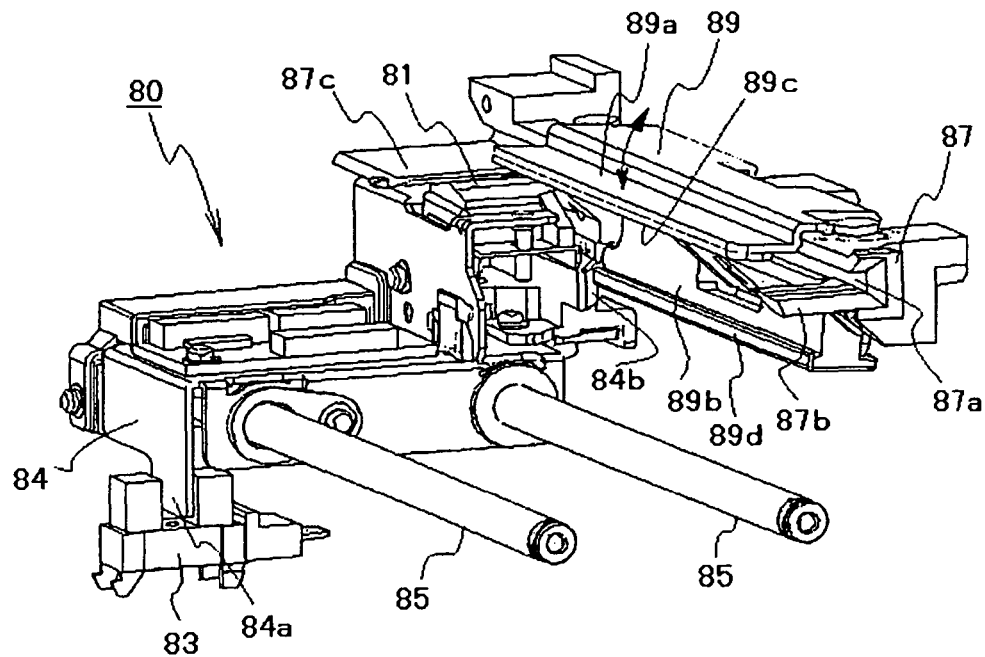
FIG. 7 is a sectional view of the magnetic encoder unit advancing and retreating mechanism.

As shown in FIG. 7, the head advancing mechanism is composed of oblique guides 87*b* and 87*c* (see FIG. 12 for a sectional view of the structure) formed to project to a movement locus side of the magnetic head 81 from the leading and trailing edges in the direction of card conveyance of the fixed side edge guide 87 that forms a guide channel 87*a* to support side edges of the card C, and an oblique portion 84*c* that engages the oblique guides 87*b* and 87*c* at the leading and trailing edges in the direction of card conveyance to retreat the magnetic head 81 downward, formed by the head carriage 84. Note that the oblique portion 84*c* is disposed in front and behind to sandwich the magnetic head 81. Care has been taken so that the magnetic head 81 does not come into contact and damage the oblique guides 87*b* and 87*c*. Also, a pressure plate 89 having a reversed L-shape swinging arm, has a rubber body 89*c* made of EPDM material glued to a surface that presses the card C of a projecting arm 89*a* using a two-sided adhesive. A touching guide 89*d* is formed on another other projecting arm 89*b* parallel to the moving direction of the head carriage 84. Also, a touching guide swinging oblique surface 84*b* that presses the touching guide 89*d* when moved is formed on the head carriage 84 side. When the touching guide swinging oblique surface 84*b* presses the touching guide 89*d* along with the movement of the head carriage 84 from its home position, the pressure plate 89 is moved in the direction of the arrows in the drawing so the rubber body 89*c* pressingly supports the stopped card C from above.

Therefore, the head advancing mechanism raises and lowers the pressure plate with regard to the card conveyance surface of the card conveyance path P1 (switchback path P2) by being interlocked to the advancing and retreating of the magnetic head 81 between the retreated position positioned below the card conveyance surface of the card conveyance path P1 and the operating position to write to and read from the magnetic strip on the card C.

The magnetic head 81 presses against the magnetic strip on the card C sandwiched in a temporarily stopped state by the nip roller 45 and the feed roller 46 to record information to the strip by moving over the necessary region within the entire region from an edge of the magnetic strip in that state. The fixed side edge guide 87, the movable adjusting side edge guide 88, the nip roller 45 and the feed roller 46 are disposed to contribute to the conveyance of the card C at positions retreated from the locus of the head so that they do not hinder the movement of the magnetic head 81.

As described above, the card discharge outlet 82 is formed in a portion of the magnetic encoder unit 80 to enable the card C conveyed along the conveyance path P1 to be discharged outside of the apparatus. When the information is incorrectly written by the magnetic head 81, the conveyance out roller 47 is driven to discharge the card C to outside of the apparatus via the card conveyance out outlet 82. This conveyance out roller 47 also has functions to receive into (supply) and to discharge out (convey out) of the apparatus a cleaning card to clean away dirt on the plurality of rollers that configure the card conveyance system described above.

Figure 8:
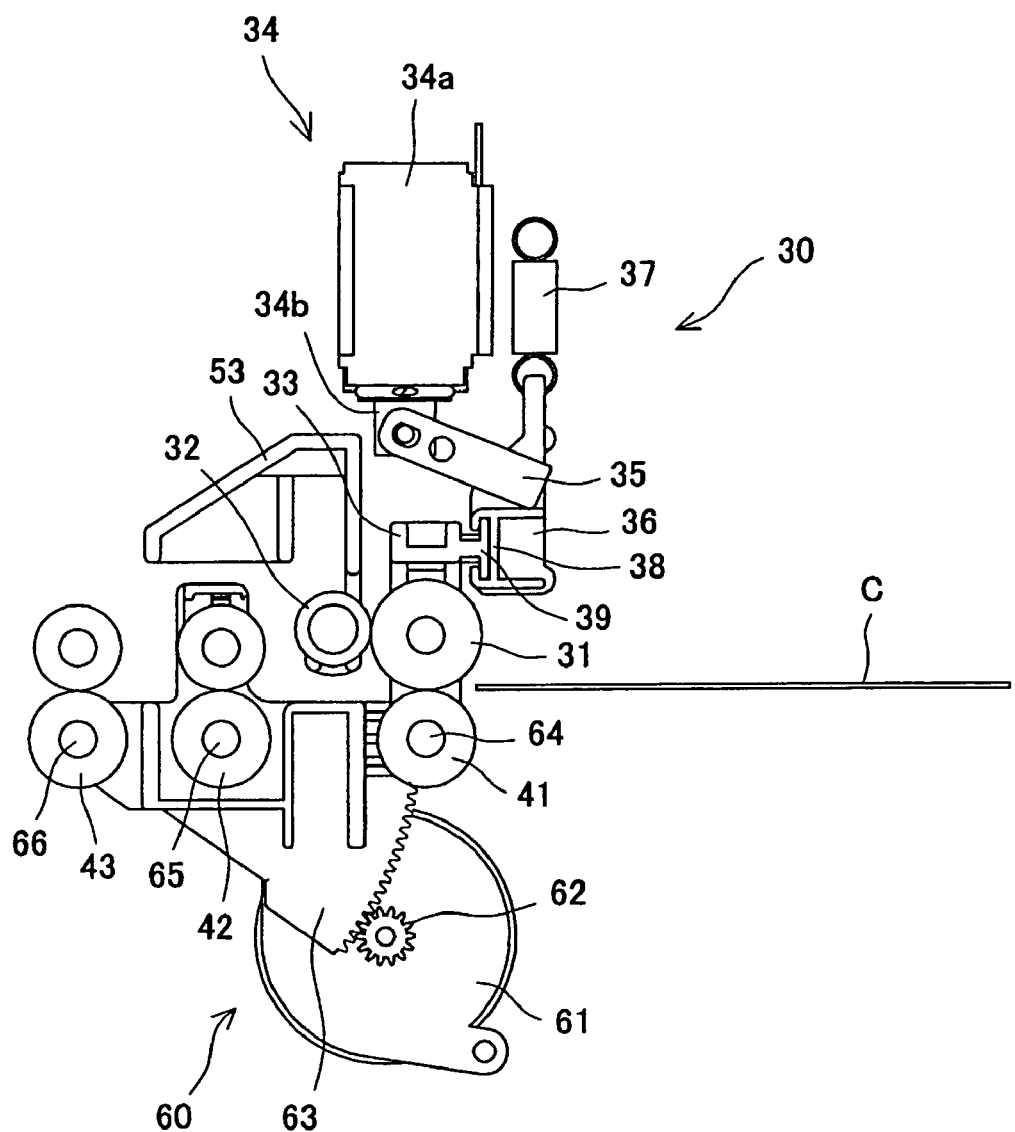
FIG. 8 is an enlarged view of a portion to explain a conveyance roller moving mechanism and operations of a card cleaning mechanism, and shows a card being conveyed therein.
Figure 9:
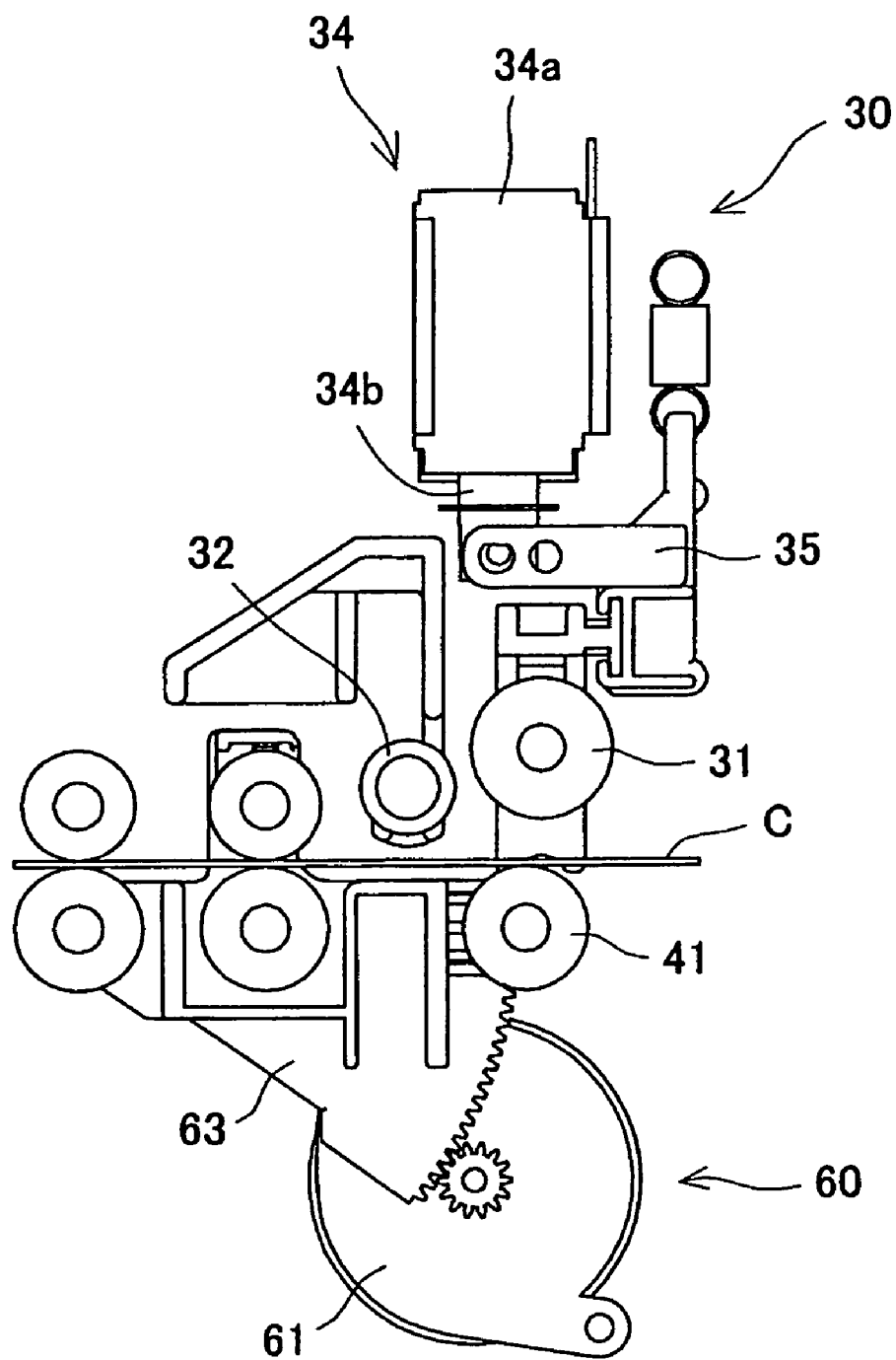
FIG. 9 is an enlarged view of a portion to explain the conveyance roller moving mechanism and operations of a card cleaning mechanism, and shows the card being conveyed in reverse when sequentially printing a plurality of colors thereupon.
Figure 10:
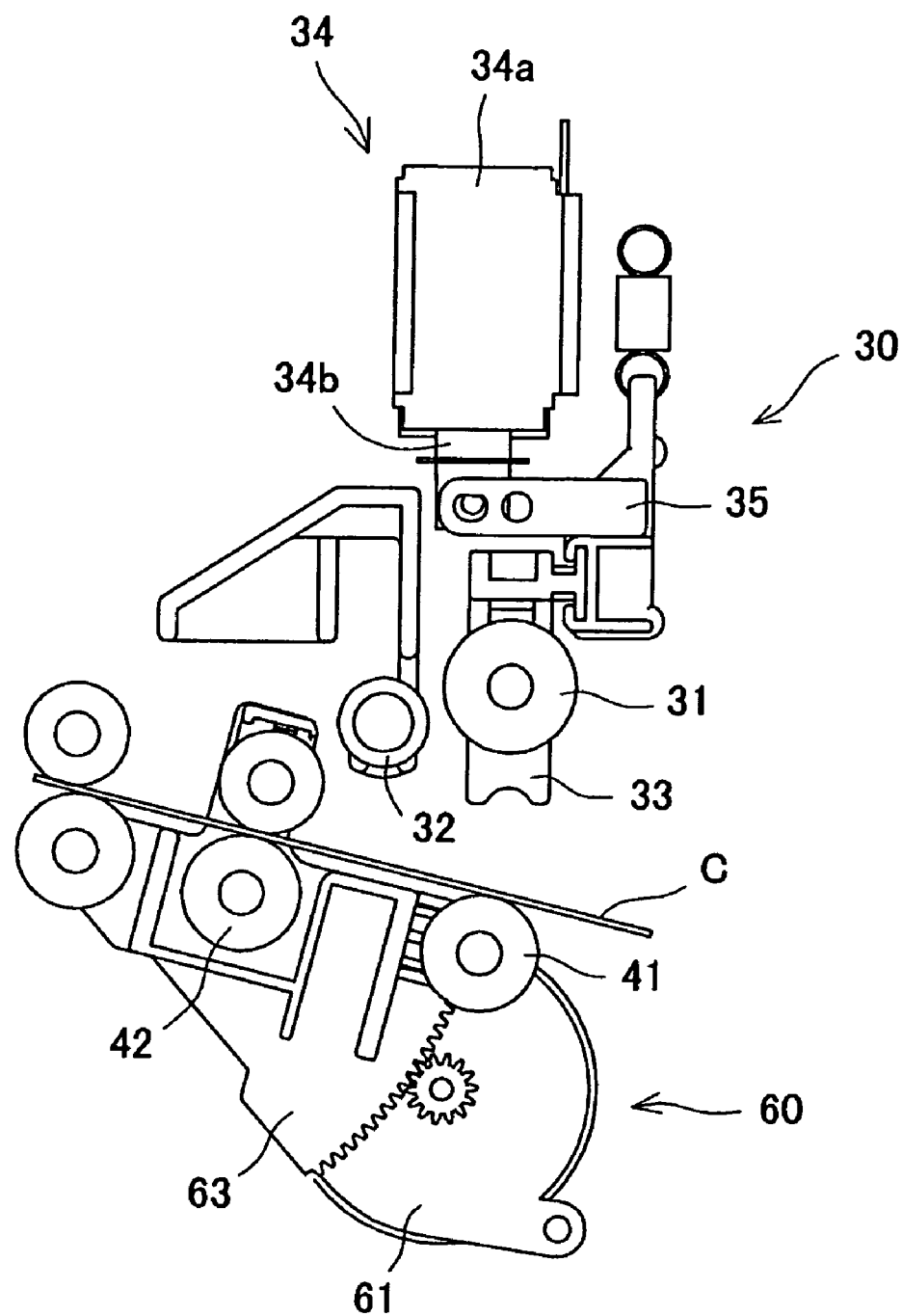
FIG. 10 is an enlarged view of a portion to explain the conveyance roller moving mechanism and operations of a card cleaning mechanism, and shows the printed card being discharged.

The following will now explain the card cleaning mechanism 30 and the moving mechanism 60 with reference to FIGS. 8 to 10. FIG. 8 shows a card C being received from the card supply opening 14 and just prior to the card C being gripped between the cleaning roller 31 and conveyance roller 41; FIG. 9 shows the card C being conveyed in reverse when sequentially print recording many colors to the print surface of the card C using the printing unit 50; FIG. 10 shows recorded card C being conveyed toward the card discharge outlet 23.

The card cleaning mechanism 30 has an actuator 34 composed of a solenoid 34*a* to enable the cleaning roller 31 to move between an operating position where it can touch the card C and the roller-shaped cleaner 32 (surface contact) by advancing into the card conveyance path P1, and a retreated position that is a home position separated from the conveyance path P1, and a plunger 34*b* that advances and retreats by the drive switch (ON/OFF) of the solenoid 34*a*.

A lever member 35 one end thereof rotatably mounted to an end of the plunger 34*b* is provided, and an engaging member 36 that engages the other end of the lever member 35 is provided. One end of the engaging member 36 is hooked to a tension spring 37 fastened to a predetermined position inside the apparatus, urging force from the tension spring 37 constantly urges the engaging member 36 upward.

The card cleaning mechanism 30 has a holder 33 that holds the cleaning roller 31, and has an integrated configuration where a convex portion 39 formed on a portion of the holder 33 is fit into a concave portion 38 formed on a portion of the engaging member 36. Specifically, the holder 33 that holds the cleaning roller 31 is detachable to the engaging member 36. The card cleaning mechanism 30 has a configuration that includes a roller-shaped cleaner 32 rotatably mounted to a support member 53 detachably installed at a predetermined position of a cartridge 52 that houses an ink ribbon R as a portion of the printing unit 50.

Further, when the solenoid 34*a* of the drive unit 34 is driven (drive ON), the lever member 35 pushes the engaging member 36 downward thereby indirectly pushing the holder that holds the cleaning roller 31 downward where the cleaning roller 31 is positioned at the operating position.

As shown in FIGS. 8 to 10, the moving mechanism 60 has a stepping motor 61 as a forward and reverse drive motor, a motor gear 62 mounted on the rotating shaft of the stepping motor 61. A geared bracket 63 has a geared portion that meshes with the motor gear 62. Roller shafts 64, 65, and 66 that support the conveyance rollers 41, 42 and 43 are held by the geared bracket 63.

Because the geared bracket 63 is provided to rotate around the roller shaft 66 of the conveyance rollers 43, the moving mechanism 60 allows the conveyance rollers 41 and 42 to move between the first position (a position where the conveyance rollers 41 and 42 form a substantially horizontal card conveyance path; a home position, see FIGS. 8 and 9) and the second position (a position where the conveyance rollers 41 and 42 form an oblique conveyance path; see FIG. 10).

The following will now explain the control and electrical systems of the printer apparatus 1. As shown in FIGS. 2 and 3, the printer apparatus 1 has a control unit 95 that controls overall operations of the printer apparatus 1 and a power unit 90 that converts commercial alternating current into direct current to drive and operate each of the mechanisms and control unit.

As shown in FIG. 11, the control unit 95 comprises the microcomputer 95b (hereinafter referred to as the microcomputer 95b) that controls the overall processes of the printer apparatus 1. The microcomputer 95b is composed of a CPU that operates under a high-speed clock as its central processing unit, a ROM written with basic control operations (programs and program data) of the printer apparatus 1, and RAM as the CPU work area, and internal busses connecting these.

External busses are connected to the microcomputer 95b. An interface, not shown, that communicates with the host apparatus 100, and a buffer memory 95a that temporarily stores print recording data to be printed on the card C, and magnetic data that should be magnetically recorded in the magnetic strip on the card C are connected to the external busses.

A sensor control unit 95c that controls signals from each sensor, an actuator control unit 95d that controls the motor driver and the like that sends the drive pulse of each motor and drive power, a thermal head control unit 95e that controls the thermal energy of the thermal head 51, an operation display unit 95f that controls the operation panel 5, and the magnetic encoder unit 80 are connected to the external busses. The sensor control unit 95c is connected to a first card detection sensor composed of the light-emitting element 48 and light-receiving element 49, to a second card detection sensor composed of a light-emitting element 56 and light-receiving element 57, and another sensor, not shown. The actuator control unit 95d is connected to the stepping motor 61, the conveyance drive motor 70 and another motor, not shown, and the actuator 34, the thermal head control unit 95e is connected to the thermal head 51 and the operation display control unit 95f is connected to the operation panel 5.

The power unit 90 supplies operating and drive power to the control unit 95, the thermal head 51, the operating panel 5 and the magnetic encoder unit 80. (See FIG. 11.)

The following will now explain the operations of the printer apparatus 1 according to this embodiment, and the microcomputer 95b CPU (hereinafter referred simply as the CPU).

When power is charged to the control unit 95, the CPU reads programs and program data stored in ROM (and expands to RAM) and conducts an initializing process that operates each mechanism. Specifically, in the initializing process, the connections of each of the control units 95a, and 95c to 95f of the sensor control unit 95c connected to the microcomputer 95b via the external busses and that composes the control unit 95, and of the magnetic encoder unit 80 are checked. Then a decision is made based on signals from the sensor control unit 95c whether each composing unit is at its home position (see FIGS. 2 and 8). If the composing units are not at their home positions, the composing units are moved to their home positions. If, based on the signals of the sensor control unit 95c, each composing element does not move to its home position after a plurality number of repeated attempts to return them to their home positions, the host apparatus 100 is notified and a message is displayed on the display unit 4 via the operation control display unit 95f. Also, in the initializing process, it is decided whether a card is stored in the card supply unit 10 based on signals from the sensor unit 95c. If there is no card, in the same way as described above, the host apparatus 100 is notified and a message is displayed on the display unit 4. The system then idles until a card is stored in the card supply unit 10 and a clear button, not shown, is pressed.

Concurrently to the initialization process, the CPU drives the head drive mechanism in response to the detection results of the magnetic head 81 by the head detection sensor 83 when the apparatus power is turned on to initialize the head by moving the magnetic head 81 to its home position. In other words, when the power is turned on, the CPU drives the direct current motor equipped with an encoder, not shown, via the actuator control unit 95d when the head detection sensor 83 has detected the magnetic head 81 (See the state shown in FIG. 12A. At that time, the magnetic head 81 is positioned at its home position in the head idling region a2 (see FIG. 4), and the head detection sensor 83 is off and outputs a low-level signal, for example.) to move the magnetic head 81 upstream in the direction of the arrow A in FIG. 12A using the head drive mechanism. If the head detection sensor has not detected the magnetic head 81, (See the state in FIG. 12B. At that time, as an example, the head detection sensor 83 is positioned a distance d1 4 mm from the center of the head detection sensor 83, and the head detection sensor 83 is on and outputs a high-level signal.) the CPU switches back the magnetic head 81 downstream as shown by the arrow B in FIG. 12B. The head detection sensor 83 is set at a home position to detect the magnetic head 81. (See the state shown in FIG. 12C.) For the home position, the head carriage 84 is separated predetermined distance d2 (in this example, the distance is 2.7 mm) from the edge of the carriage guide 85. The magnetic head 81 is set at a position of a predetermined distance from the center of the head detection sensor 83 (for example, 3 mm).

Figure 12A:
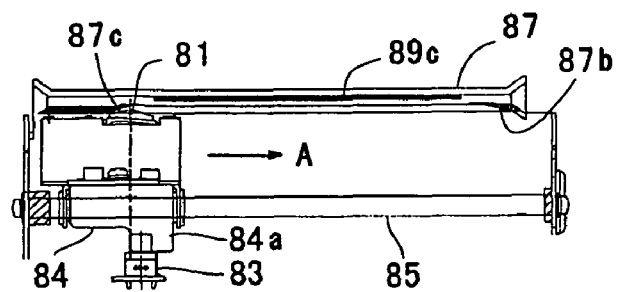
FIGS. 12A to 12E are views to explain the operations of the magnetic head initialization, showing the detection and non-detection states of the magnetic head by a head detection sensor.
Figure 12B:
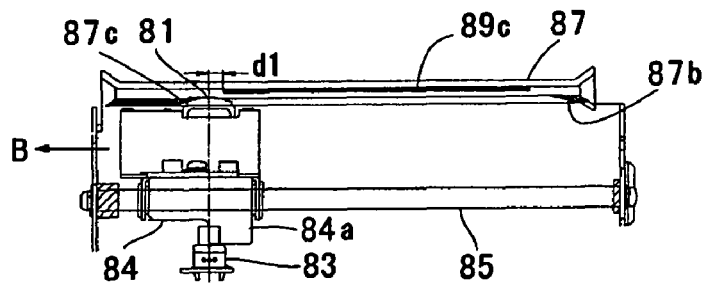
Figure 12C:
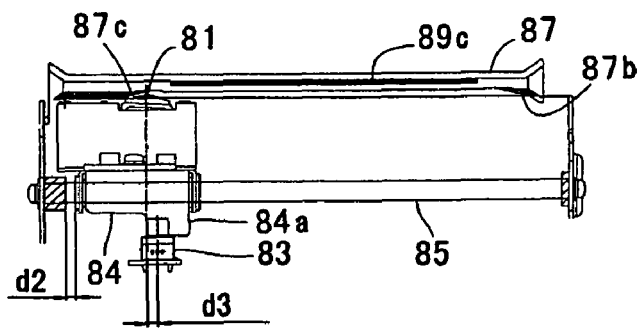
Figure 12D:
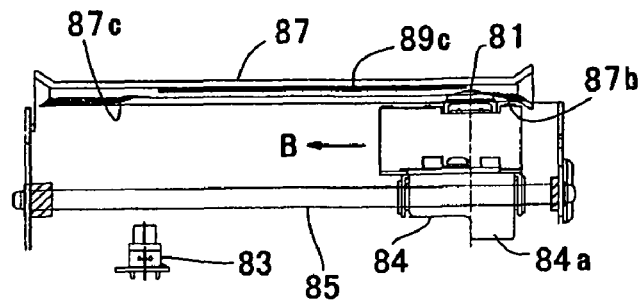
Figure 12E:
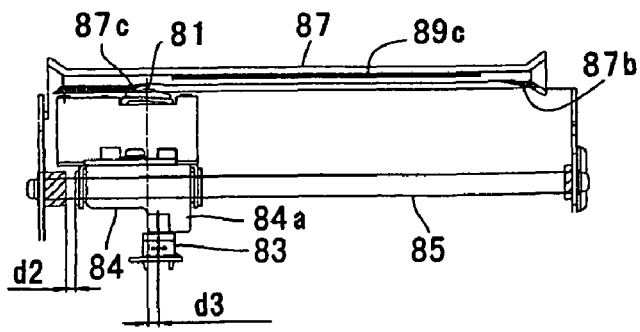

Further, when the apparatus power is turned on, the CPU moves the magnetic head 81 downstream shown by the arrow B in FIG. 12D when the head detection sensor 83 has not detected the magnetic head 81 (See the state shown in FIG. 12D. The magnetic head 81 is not positioned within the head idling region a2 (see FIG. 4), and the head detection sensor 83 is on and outputting a high-level signal.) to set the head detection sensor 83 at the home position to detect the magnetic head 81. (See the state shown in FIG. 12E.) The reason for initializing the head is because there are instances when the magnetic head 81 is not positioned at the home position when it should be at the home position in the head idling region a2 when the power is turned on because of some phenomenon (such as a power interruption).

A printer driver installed in the host apparatus 100 determines various parameters to control the recording operation at the printer apparatus 1 based on recording instructions specified by an operator (a user), then generates print recording data to record to the card C and magnetic recording data using the recording instructions. Those are sent to the printer apparatus 1. Parameter values for the recording control instructions, image data and character data attained by disassembling print recording data into the color components of Y, M, C and Bk and magnetic recording data are stored in the buffer memory 95a of the control unit 95. Note that with this embodiment, data is disassembled into its color components (the original data is R, G, B) at the host apparatus 100 and that is converted from R, G, B to Y, M, C at the printer apparatus 1 and used as the image data. Bk data extracted at the host apparatus 100 is used as Bk data in the same way at the printer apparatus 1 to be character data.

The CPU reads the recording control instruction (parameter values) stored in the buffer memory 95a to control each mechanism in the following way according to the parameter values and program and program data expanded to RAM. Initially, the actuator 34 (solenoid 34a) is driven (turned ON) via the actuator control unit 95d to move the cleaning roller 31 from its retreated position (home position) shown in FIG. 9 to the operating position shown in FIG. 8 to prepare to receive the card C. At that time, the moving mechanism 60 positions the conveyance rollers 41 and 42 at the first position (home position) to form a substantially horizontal card conveyance path. (See the states shown in FIGS. 2 and 8.)

Further, the CPU operates the conveyance drive motor 70 via the actuator control unit 95d to drive each of the rollers disposed on the card conveyance path P1 via the drive transmission mechanism and forward drives a motor, not shown, to rotatably drive the supply roller 11 via the actuator control unit 95d. This process conveys the lowermost card C of the card supply unit 10 between the supply roller 12 and the separating gate 13 and into the casing 2 via the card supply opening 14. The printing surface of the card C is cleaned by the cleaning roller 13 and conveyed along the card conveyance path P1 toward the card conveyance outlet 82. (See FIG. 2.) When the trailing edge of the card C is detected by the first card detection sensor composed of the light emitting element 48 and the light receiving element 49, the CPU uses that card trailing edge detection as a trigger to stop (turn OFF) the drive of the actuator 34 (solenoid 34a). This cleaning roller 31 is freed by a pressing action of the lever member 35 and is moved from the operation position shown in FIG. 8 to the retreated position which is the home position shown in FIG. 9.

The card C is conveyed by the conveyance drive motor 70 over the card conveyance path P1 toward the card discharge outlet 82 until both ends of the card C are at a position where they are nipped by the feed roller 46 and the nip roller 45. The CPU stops the conveyance drive motor 70 after the card trailing edge detection from the second card detection sensor composed of the light-emitting element 56 and the light-receiving element 57 when a number of pulses of the conveyance drive motor 70 reaches a predetermined value. This process stops and holds the card C with both edges in a nipped state by the conveyance roller 47 and the nip roller 45. The card C is then in a state where magnetic recording data can be written to the magnetic strip by the magnetic head 81 of the magnetic encoder unit 80.

The CPU drives the direct current motor equipped with an encoder, not shown, to move the magnetic head 81 from the home position to the operating position using the head drive mechanism to write information to the magnetic strip on the card C. First, the head advancing mechanism presses the top surface of the card C with the pressure plate 89 to prevent the card C from lifting (separating from the card conveyance path P1 by the pressure from the magnetic head 81 at the magnetic encoding regional). In this state the pressure on the magnetic head 81 that was positioned at the retreated position below the switch back path P2 is released so the magnetic head 81 presses against the magnetic strip on the card C. Next, the CPU outputs magnetic recording data stored in the buffer memory 95a to the magnetic encoder unit 80 via the external bus, and drives the direct current motor equipped with an encoder, not shown, thereby driving the head drive mechanism to move the magnetic head 81 upstream shown at the arrow A in FIG. 4 over the necessary region over the entire region from one edge to the other edge on the magnetic strip on the card C to record that magnetic recording information on the magnetic strip.

Figure 4:
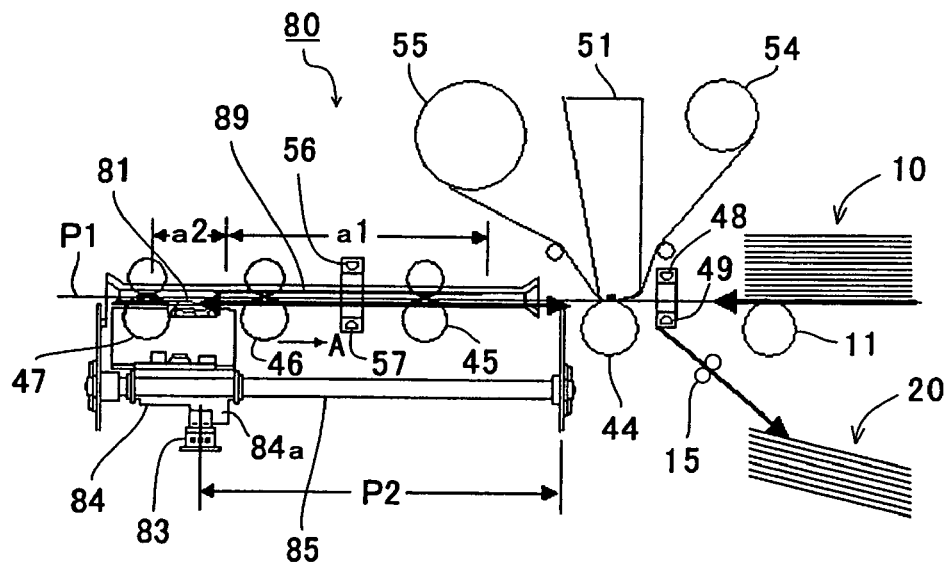
FIG. 4 is a schematic sectional view of the essential portion of a magnetic encoder unit in the printer apparatus.
Figure 5:
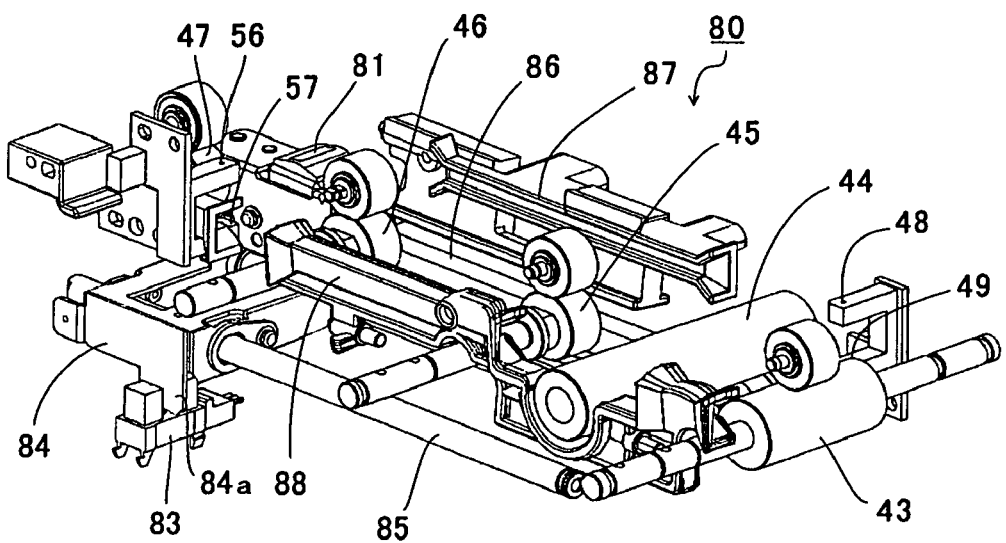
FIG. 5 is an external perspective view of the magnetic encoder unit.
Figure 6:
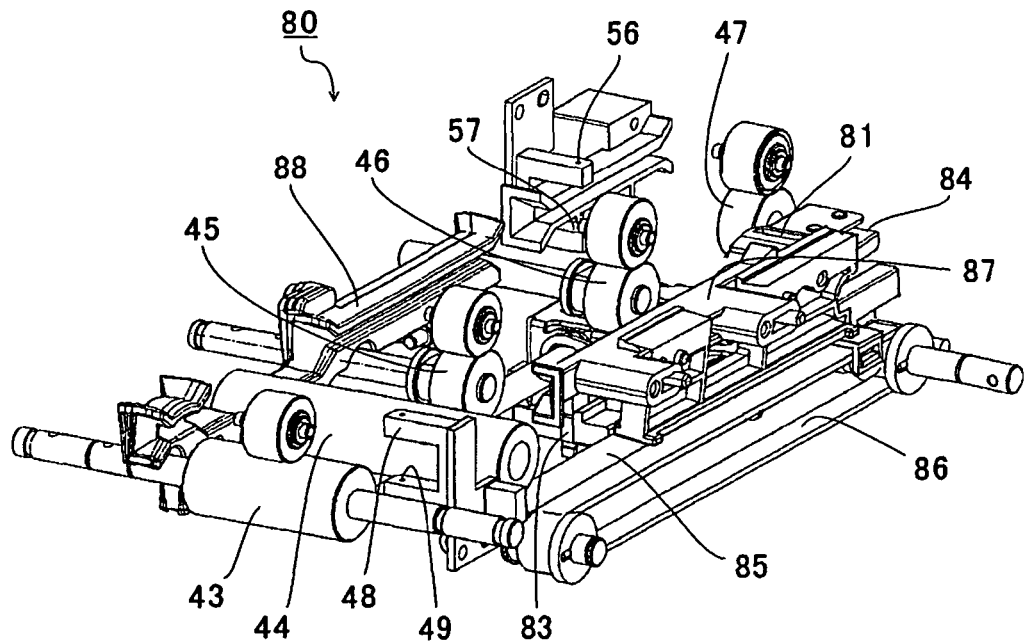
FIG. 6 is an external perspective view looking at the essential portion of the magnetic encoder unit from a different angle.

Further, when the process to write the magnetic recording information to the magnetic strip on the card C has been completed, the CPU stops the direct current motor equipped with an encoder, not shown, and reverses its drive to read the magnetic recording information written to the magnetic strip on the card C by moving the magnetic head 81 downstream in the opposite direction to the arrow A in FIG. 4. Thus verifying that the magnetic recording data stored in the buffer memory 95a matches the magnetic recording data recorded in the magnetic strip on the card C. (This is a check that the data was written correctly.) the above-mentioned verification process is completed, the magnetic head 81 returns to its home position.

In the event that the results of the verification show that the data was written incorrectly, the CPU notifies the host apparatus 100 and displays a message to that affect on the display unit 4. When an operator presses the clear button, not shown, the conveyance drive motor 70 is driven a predetermined number pulses (in the forward direction) to convey the card C out of the apparatus via the card conveyance out outlet 82. Next, a new card C is supplied from the card supply unit 10. Similarly, the magnetic encoder unit 80 writes magnetic recording data to the magnetic strip on the new card C and verifies that it is correctly written.

In a case where there is no problem in the results of the verification from the microcomputer of the magnetic encoder unit 80 (when magnetic recording data is correctly written to the magnetic strip on the card C), the CPU drives the conveyance drive motor 70 in reverse. This conveys the card C stopped with both edges nipped by the nip roller 45 and the conveyance roller 47 in a reverse direction to the card supply opening 14 along the card conveyance path P1. While the card C is being conveyed in the reverse direction, the trailing edge of the card C is detected by the first detection sensor composed of the light-emitting element 48 and light-receiving element 49. At that time, the conveyance drive motor 70 continues to drive in the reverse direction for a predetermined number of pulses and then stops its drive. This causes latter half of the card C in the conveyance direction to be stopped and held in a nipped state by the conveyance rollers 42 and 43, and the half-way portion from the trailing edge of the card C in the conveyance direction to be supported by the conveyance roller 41. (See FIG. 9)

The CPU drives a motor, not shown, causing the ink ribbon R of the cartridge 52 to be taken up at the ribbon take-up reel 55. The CPU uses the time that the transmissive sensor composed of the light emitting element 58 and light receiving element 59 detects the edge of the ink layer Bk (black) (when the light receiving element 59 detects a switch from a non-transmissive state of the light from the light emitting element 58 caused by the ink layer Bk to a transmissive state) as a trigger to drive the motor, not shown, further a predetermined number of steps to set the top of the ink ribbon so that the leading edge of the ink layer Y (yellow) is positioned at the thermal head 51 and platen roller position.

Next, the CPU drives the conveyance drive motor 70 in the forward direction to convey the card C toward the card discharge outlet 82 over the card conveyance path P1 and at the same time verify the position of the leading edge of the card C using the first card detection sensor composed of the light emitting element 48 and the light receiving element 49 and prints predetermined characters and images on the surface of the card C according to the print recording data using the printing unit 50. Specifically, the thermal head 51 presses against the card C surface with the ink ribbon R (the ink layer Y portion) interposed therebetween and selectively activates heating elements of the thermal head according to image data of the color Y (image data whose Y component was converted from the RGB data). This directly transfers the thermal transfer ink component of Y (yellow) coated on the ink ribbon R to the surface of the card C.

Further, backside of the card C is supported by the platen roller 44, but initially it is nippingly conveyed by the conveyance rollers 42 and 43 toward the card discharge outlet 82 over the card conveyance path P1. The leading edge of the card C is nippingly conveyed by the nip roller 45 and the trailing edge of the card C is nipping conveyed by the conveyance roller 43, and finally it is nippingly conveyed by the nip roller 45 (while the backside of the trailing edge of the card C is supported by the platen roller 44). Therefore, the conveyance rollers 42 and 43 and the nip roller 45 function as capstan rollers to nip the card C and convey it at a constant speed when print recording using the printing unit 50. The CPU checks the position of the trailing edge of the card C with the card detection sensor composed of the light emitting element 48 and light receiving element 49, and continues to drive the conveyance drive motor 70 in the forward direction for a predetermined number of pulses and then the drive is stopped.

The CPU drives the conveyance drive motor 70 in reverse to convey the card C in reverse along the card conveyance path P1 to the card supply opening 14. The card C is stopped and held with the back half in the conveyance direction in a nipped state by the conveyance rollers 42 and 43 and the front half in the conveyance direction supported by the conveyance roller 41. At that point the drive of the conveyance drive motor 70 is stopped. (See FIG. 9) The CPU drives a motor, not shown, to slightly wrap the ink ribbon R of the cartridge 52 to the ribbon take-up reel 55 so that the leading edge of the ink layer M (magenta) is positioned at the thermal head 51 and platen roller 44 position. Next, the CPU drives the conveyance drive motor 70 in the forward direction to convey the card C along the card conveyance path P1 toward the card discharge outlet 82 and directly transfers the thermal transfer ink component of the ink layer M (magenta) coated on the ink ribbon R to the surface of the card C. In the same way, the CPU directly transfers the thermal transfer ink components of the ink layers C (cyan) and Bk (black) coated on the ink ribbon R to the surface of the card C using the printing unit 50. This forms a color image on the surface of the card C using the colors of Y, M, C and Bk.

The CPU conveys the card C toward the card discharge outlet 23. Specifically, when the conveyance drive motor 70 is driven in reverse, the card C is conveyed along the card conveyance path P1 in reverse toward the card supply opening 14. As shown in FIGS. 8 and 9, when sequentially print recording multiple colors onto the print surface of the card C, the conveyance rollers 41 and 42 are kept at the first position positioned to form a substantially horizontal card conveyance path when the card C is being conveyed in reverse to the card supply opening 14 (see the state shown in FIG. 9). However, when the card C has completed the predetermined recording processes and is being conveyed toward the card discharge outlet 23, using the point where the card detection sensor composed of the light emitting element 48 and the light receiving element 49 detects the trailing edge of the card C being conveyed in reverse over the card conveyance path P1, or when the trailing edge of the card C is detected and conveyed further a predetermined number of pulses as a trigger, the CPU controls the drive of the stepping motor 61 so the moving mechanism 60 (drive from the stepping motor 61) moves the conveyance rollers 41 and 42 to the second position positioned where it forms an oblique card conveyance path (see the state in FIGS. 3 and 10), and drives a motor, not shown in reverse to rotatably drive the supply roller 11 and rotatably drives the discharge roller 15.

With the above-mentioned processes, the card C will either be stored in the card storage unit 20 via the card discharge outlet 23, or it is discharged from the card discharge outlet 21 to outside the apparatus (when the card storage unit 20 is full of cards). Note that when the card is discharged as shown in FIG. 10, the cleaning roller 31 is positioned at its retreated position that it is at its home position separated from the card conveyance path P1 in the same state that is shown in FIG. 9.

When the CPU either stores the card C in the card storage unit 20 or discharges it from the card discharge outlet 21, the reverse drives of the conveyance drive motor 70 and the motor, not shown, are stopped. Note that the CPU drives the stepping motor 61 (rotatably driven in an opposite direction) at the predetermined timing when the discharge operation to the card storage unit 20 of the card C has been completed, to recover the conveyance rollers 41 and 42 from the second position positioned to form an oblique card conveyance path to the first position positioned to form a substantially horizontal card conveyance path. This completes the recording processes to the card C. If there is a subsequent job, the operations described above are repeated. The following will describe the effects of the printer apparatus 1 of this embodiment.

The card supply opening 14, the printing unit 50 (first recording unit) and the magnetic encoder unit 80 (second recording unit) are disposed in succession substantially horizontally along the card conveyance path P1 of the card C that is being conveyed in the printer apparatus 1 according to the present invention. Also, the card discharge outlet 23 is provided at one side of the casing 2 so that the card supply opening 14 and the card discharge outlet 23 can be arranged in a vertical direction. For that reason, the card conveyance path does not need to be long so the apparatus can be more compact.

Also, the printer apparatus 1 according to the present invention has the conveyance rollers 41 and 42 that convey the card C, disposed between the card supply opening and the printing unit 50. A moving mechanism 60 is provided that moves the conveyance rollers 41 and 42 between a first position that forms a substantially horizontal card conveyance path P1 to convey the card C, and a second position that conveys the card C recorded at the printing unit 50 and the magnetic encoder unit 80 toward the card discharge outlet 23. For the above reason, the moving mechanism 60 moves the conveyance rollers 41 and 42 between the first position that forms the horizontal conveyance path and the second position to convey the card C toward the card discharge outlet 23. The card conveyance path to the card discharge outlet 23 positioned below the card supply opening 14 is short to discharge the card, and the apparatus can be more compact.

Further, the printer apparatus 1 of this embodiment is provided with a conveyance drive motor 70 that rotatably drives the conveyance rollers 41 and 42 in both the forward and reverse directions. The conveyance drive motor 70 is arranged below the printing unit 50, and between the magnetic encoder unit 80 and moving mechanism 60. For that reason, a plurality of composing units is disposed in a rational manner so the apparatus can be more compact.

The printer apparatus 1 shares the card conveyance system in the magnetic encoder unit 80 and the switchback path P2 that conveys the card C in reverse to the printing unit 50. By sharing the switchback path P2, a new path for equipping the magnetic encoder unit 80 is unnecessary. Furthermore, it is possible to use the space created by the switchback path P2 as space to dispose the magnetic encoder unit 80, thereby making the printer apparatus 1 compact. Also, by longitudinally feeding the card C, it is possible to establish a side surface guide (the fixed side edge guide 87 and the movable adjusting side edge guide 88) that guides both sides of the card C to read and write data to the magnetic strip on the card C using the entire region thereof from one edge to the other edge. It is possible to smoothly convey the card C by these side surface guides and to read and write data by moving the magnetic head 81 over the entire region from one edge to the other edge along the magnetic strip in the card C.

Also, when conveying the card C over the card conveyance path P1 without reading or writing information to the card C using the magnetic head 81, the magnetic head 81 of the printer apparatus 1 of this embodiment is positioned at its retreated position below the card conveyance surface of the card conveyance path. For the above reason, the card C can be smoothly conveyed without being hindered by the magnetic head 81.

Further, the printer apparatus 1 magnetically records information to the magnetic strip on the card C at the magnetic encoder unit 80 by self-propelling the magnetic head 81 over the magnetic strip. Compared to a magnetic encoder unit of the type that conveys the card C (with the magnetic head 81 stationary), this configuration increases the precision of both the printing using the printing unit 50 and magnetic recording at the magnetic encoder unit 80, and the apparatus can be more compact. The reasons for increased precision are outlined below.

The print resolution of the printing unit 50 is (1) 300 dpi. The magnetic recording process to the magnetic strip on the card C by the magnetic encoder unit 80 is (2) 210 bpi (bits per inch) for one and three tracks, and (3) 75 bpi for two tracks. The lowest common multiple (the lowest common multiple of 300, 210 and 75) of (1) to (3) is 21,000 (pulses per inch). The result of not easily attaining a lowest common multiple is that it is not possible to attain both the resolution and a compact apparatus with the magnetic encoder unit of the type that scans by conveying the card C. (It is not possible to have the motors and gear sizes used in the magnetic encoder unit adopted by the invention.) With these conditions, if the drive transmission mechanism that transmits the drive of the conveyance drive motor 70 is shared, either print precision or magnetic recording precision must be ignored to enable a compact apparatus, so either of the processing precisions is decreased. Therefore, with the printer apparatus 1 of this embodiment, the processing precision of the printing unit 50 and the magnetic encoder unit 80 are improved (or the high precision is maintained) using the scanning type magnetic head 81 of the magnetic encoder unit 80, and the overall apparatus will be more compact.

The printer apparatus 1 has a card conveyance out outlet 82 disposed on a portion of the magnetic encoder unit 80 that conveys the card C to outside of the casing 2, at the other side of the casing 2 opposing the card supply opening 14. For that reason, other than using the card discharge outlet 23, it is also possible to discharge the card C from the card conveyance out outlet 82, thereby improving convenience for users. However, it is possible to receive into (supply) and discharge (convey out) out of the apparatus via the card conveyance out outlet 82 a cleaning card that cleans away dirt on the plurality of rollers that configure the card conveyance system, and the fixed side edge guide 87 and the movable side edge guide 88.

Also, the printer apparatus 1 has the cleaning roller 31 disposed between the card supply opening 14 and the conveyance roller 42 to clean a surface of the card C. When the card C is conveyed into the casing 2, the surface of the card C is cleaned by the cleaning roller 31. For that reason, it is possible to prevent foreign matter such as dust and dirt from getting into apparatus, and to raise the print quality when printing to the surface of the card C at the printing unit 50.

In the printer apparatus 1, the roller-shaped cleaner 32 that removes dirt from the surface of the cleaning roller 31 is fastened to a portion of the cartridge 52. Therefore, the roller-shaped cleaner 32 can be replaced by replacing the cartridge, thereby improving usability.

With the printer apparatus 1, the head drive mechanism is driven in response to the detection results of the magnetic head 81 by the head detection sensor 83, when the apparatus power is turned on to initialize the head by moving the magnetic head 81 to its home position. Therefore, even if there is a power interruption or the commercial alternating current power to the power unit 90 of the printer apparatus 1 is accidentally cut, it is possible to return the magnetic head 81 to its home position when the power is turned back on to increase the reliability (certainty of reading and writing) of the printer apparatus 1 and reduce improperly written cards.

According to the present invention, a card C is used as an example of a recording medium. However, the present invention is not limited thereto and can be applied to a sheet-shaped recording medium. This can be applied to any printing apparatus including copiers and ink jet printers. In such a case, instead of the printing unit 50 and magnetic encoder unit 80, it is acceptable to apply the technology of known recording and printing methods.

It is to be noted that this embodiment of the present invention provides an example of a card that has a magnetic strip and a magnetic encoder unit 80, but these are not to be construed as limitations to the present invention. For example, it is acceptable to use an IC card and to write information either through contact or non-contact to the IC card. Also, an example has been provided in this embodiment to print with the printing unit 50 after magnetically recording with the magnetic encoder unit 80 to reduce costs incurred when recording is poor, but that is not to be considered a limitation to the present invention. It is also possible to magnetically record at the magnetic encoder unit 80 after printing at the printing unit 50, and to conduct the recording process at either the printing unit 50 or the magnetic encoder unit 80.

An example was described in this embodiment of a system configured with the host apparatus 100, but it is also acceptable to equip the printing unit 50 with a media reading unit to read data recorded on an MO, CD or DVD and the like, and to enable operation of the printer apparatus 1 according to recording operation instructions from the operation panel 5.

Furthermore, an example was explained to discharge the card C from the card conveyance out outlet 82 when writing to the magnetic strip on the card C is improper, but it is also acceptable to convey the card C to the card discharge outlet 23 to discharge the card C at the card discharge outlet 23, and to convey the printed card C along the card conveyance path P1 and discharge it from the card conveyance out outlet 82.

In this embodiment, an example was explained to print using the colors of Y, M, C, and Bk in the printing process at the printing unit 50, but the present invention is not limited thereto and can also print using only Bk. Furthermore, an OP layer (transparent protective layer) can be added to the ink ribbon R to cover the surface of the card C using that transparent protective layer.

This application claims priority rights from Japanese Pat. Application No. 2006-353841 (filed Dec. 28, 2006) which is herein incorporated by reference.

While the invention has been explained with reference to the specific embodiments of the invention, the explanation is illustrative and the invention is limited only by the appended claims.

What is claimed is:

1. A card recording apparatus comprising:
   an apparatus frame;
   a card supply opening at one side of the frame;
   a first recording unit configured to perform a predetermined recording to a card supplied from the card supply opening;

a plurality of rollers that nips the card when being recorded at the first recording unit;

a second recording unit disposed adjacent to the first recording unit that performs a predetermined recording to the card nipped by the rollers; and a card discharge outlet that discharges the card recorded at least one of the first and the second recording units, wherein the card supply opening, the first recording unit and the second recording unit are sequentially disposed substantially horizontally along a card conveyance path of the conveyed card; and the card discharge outlet is established at one side of the apparatus frame so that the card supply opening and the card discharge outlet are positioned vertically on top of each other.

2. A card recording apparatus comprising:

an apparatus frame;

a card supply opening at one side of the frame;

a first recording unit configured to perform a predetermined recording on a card supplied from the card supply opening;

a plurality of card conveyance rollers disposed between the first recording unit and the card supply opening;

a card discharge outlet that discharges the card recorded at the first recording unit;

wherein the card supply opening, the card conveyance rollers and the first recording unit are sequentially disposed substantially horizontally along a card conveyance direction of the card to be conveyed; and the card discharge outlet is established at said one side of the apparatus frame so that the card supply opening and the card discharge outlet are positioned vertically with respect to one another; and a moving mechanism that moves the plurality of card conveyance rollers with respect to one of the plurality of card conveyance rollers that is located closest to a side of the first recording unit as a rotational axis, between a first conveyance position that forms a horizontal conveyance path to convey the card substantially horizontally, and a second conveyance position that forms an inclined conveyance path to convey the card recorded at the first recording unit toward the card discharge outlet.

3. The card recording apparatus according to claim 2, wherein the plurality of conveyance rollers includes a pair of transfer rollers at a side of the card supply opening relative to said one of plurality of the card conveyance rollers as the rotational axis, said moving mechanism moving the card from the first conveyance position to the second conveyance position while the card is held between said pair of the transfer rollers.

4. The card recording apparatus according to claim 3, further comprising a cleaning roller, the cleaning roller being associated with one of said plurality of card conveyance rollers located at the side of the card supply opening at the first conveyance position and configured to be pressed against a card surface for clearing when the plurality of card conveyance rollers is in the first conveyance position and separated therefrom when the plurality of card conveyance rollers is in the second conveyance position.

5. The card recording apparatus according to claim 2, wherein the one, as the rotational axis, of the plurality of card conveyance rollers is configured to convey the card to the first recording unit and feed the card at a predetermined constant speed to the first recording unit.

6. The card recording apparatus according to claim 2, wherein the moving mechanism comprises:

roller shafts that support the plurality of card conveyance rollers;

a geared bracket that supports the roller shafts and has a gear at one portion;

a motor gear that meshes with the gear on the geared bracket; and a drive motor that drives the motor gear in forward and reverse directions.

7. The card recording apparatus according to claim 2, further comprising another card discharge outlet located on a side opposite to the card supply opening of the apparatus frame for discharging the card outside of the apparatus frame.

8. The card recording apparatus according to claim 7, further comprising:

a card pinch roller disposed between the first recording unit and the card discharge outlet, the card pinch roller holding the card when recording on the card by the first recording unit, and a second recording unit positioned adjacent the first recording unit, the second recording unit recording on the card held by the card pinch roller the supply opening, wherein the first recording unit, the second recording unit and said another card discharge outlet are aligned essentially horizontal along the card conveyance direction.

9. The card recording apparatus according to claim 8, further comprising a conveyance drive motor for rotatably driving the conveyance rollers in the forward and reverse directions, the conveyance drive motor being disposed below the first recoding unit and between the second recording unit and the moving mechanism.

10. The card recording apparatus according to claim 8, wherein the first recording unit is a printer that prints images and/or characters on the card; and the second recording unit is a magnetic encoder unit that magnetically records information to the card.

11. The card recording apparatus according to claim 10, wherein the magnetic encoder unit has a magnetic head that moves along the card conveyance path along which the card is conveyed.

* * * * *